Aug. 9, 1949.    G. A. DEAN    2,478,252
VARIABLE PITCH CUFF OR FAIRING FOR BLADES
Filed Dec. 10, 1945    4 Sheets-Sheet 2

Inventor
George A. Dean
By
F. P. Keiper
Attorney

Aug. 9, 1949.　　　　　G. A. DEAN　　　2,478,252
VARIABLE PITCH CUFF OR FAIRING FOR BLADES
Filed Dec. 10, 1945　　　　　　　　　　　　4 Sheets-Sheet 3
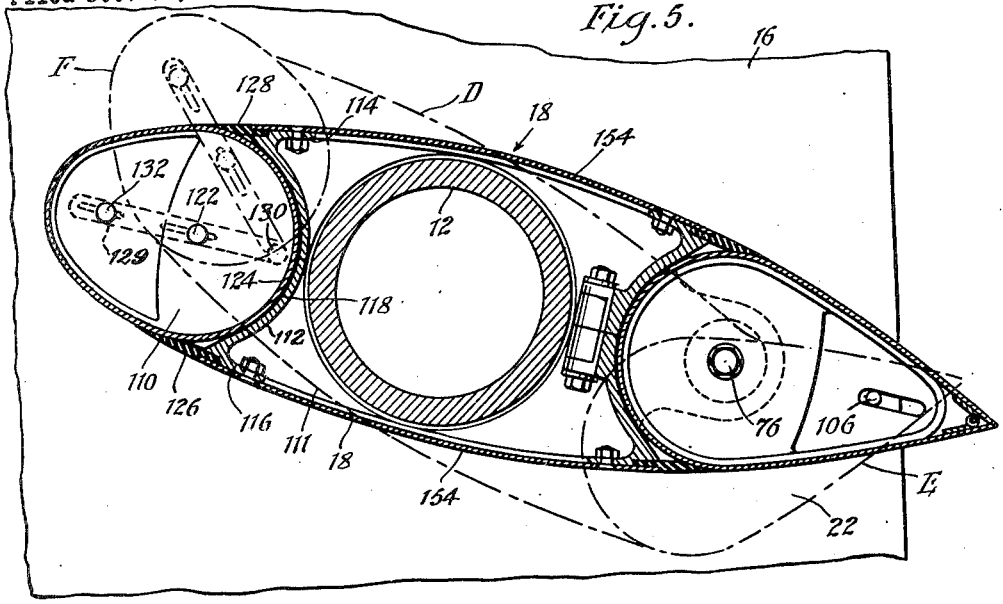
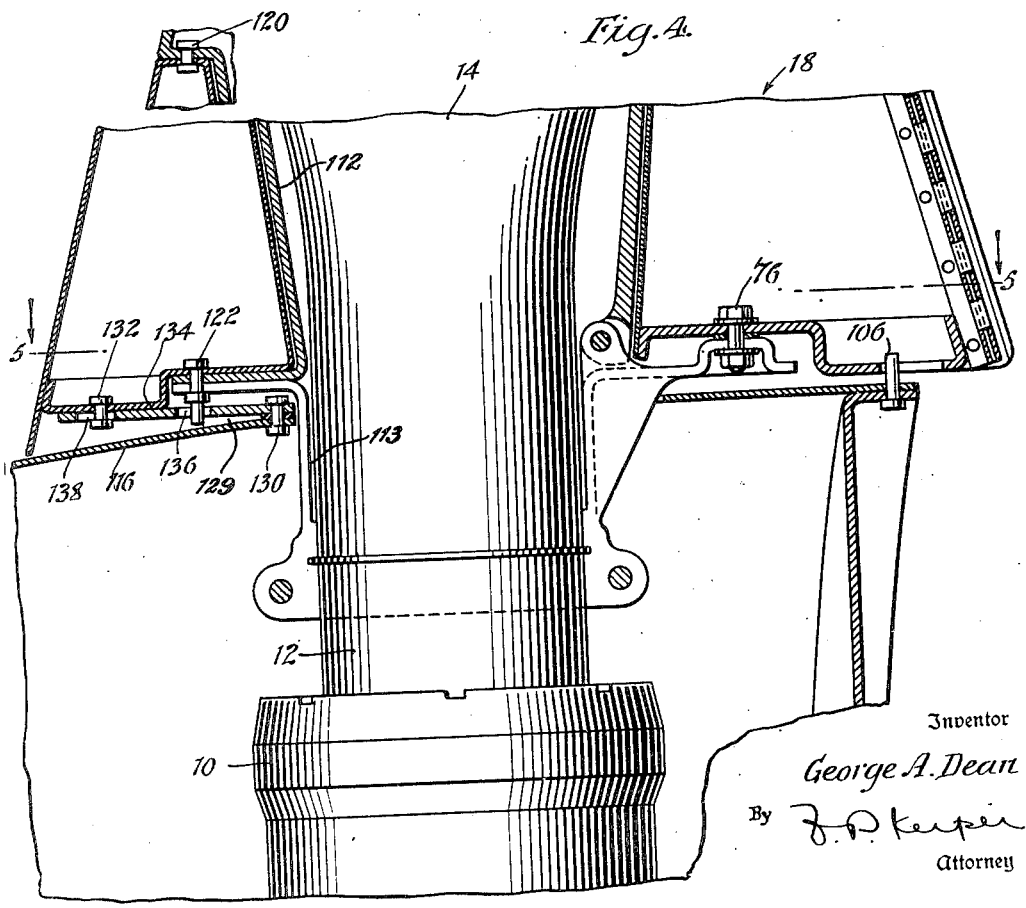
Inventor
George A. Dean
By （signature）
Attorney Aug. 9, 1949.　　　　　G. A. DEAN　　　　2,478,252
VARIABLE PITCH CUFF OR FAIRING FOR BLADES
Filed Dec. 10, 1945　　　　　　　　　　4 Sheets-Sheet 4

Inventor
George A. Dean
By
Attorney

Patented Aug. 9, 1949

2,478,252

UNITED STATES PATENT OFFICE 2,478,252

VARIABLE PITCH CUFF OR FAIRING FOR BLADES

George A. Dean, Radburn, N. J., assignor to Curtiss-Wright Corporation, a corporation of Delaware Application December 10, 1945, Serial No. 633,988

8 Claims. (Cl. 170—159)

This invention relates to variable pitch aircraft propellers wherein blade cuffs are employed to extend the effectiveness of the propeller in the region of the blade shanks. More particularly the invention relates to an articulated blade cuff capable of having its sectional air foil shape or effective pitch angle varied with respect to its supporting blade and shank, upon changes in propeller blade angle, or pitch.

In propeller blades, the pitch distribution, or gradual increase in pitch from tip to shank is usually that required to provide correct angles of attack at all stations along the blade for efficient cruising speed or maximum speed of the aircraft. When such a blade is rotated in its socket to reduce pitch for take off purposes, the angle through which the entire blade is rotated is determined by the pitch desired at the outer or greatest thrust producing portion of the blade. Reduction in pitch of the outer part of the blade for takeoff does not yield the optimum cuff pitch angle for takeoff or low airspeed.

It is accordingly an object of the present invention to provide a propeller blade cuff, whose effective pitch may vary with respect to the propeller blade with which it is associated.

Another object of the invention is to provide a propeller blade cuff whose effective pitch may vary with respect to the propeller blade with which it is associated, automatically as the pitch or angle of the blade is varied.

A further object of the invention is to provide an articulated propeller blade cuff capable of having its effective pitch varied.

Still another object of the invention is to provide in combination with a variable pitch propeller blade, a blade cuff whose air foil section may be altered to create an effective angle variable through an angular range greater than the angular range of adjustment of its supporting blade shank.

A still further object of the invention is to provide a blade cuff whose thrust and cooling fan efficiency is improved by imparting relative movement between the blade and the effective angle of the cuff upon changing blade pitch.

The above objects and other novel features of the invention will appear more fully hereinafter from the following detailed description when taken in connection with the accompanying drawings. It is expressly understood, however, that the drawings are employed for purpose of illustration only and are not to be taken as a definition of the limits of the invention, reference being had for this purpose to the appended claims.

In the drawings wherein like reference characters indicate like parts:

Fig. 4 is a view in side elevation of a propeller socket and blade having thereon a cuff articulated at both ends, the cuff being shown in section;

Fig. 5 is a section taken substantially on the line 5—5 of Fig. 4;

Figure 1:
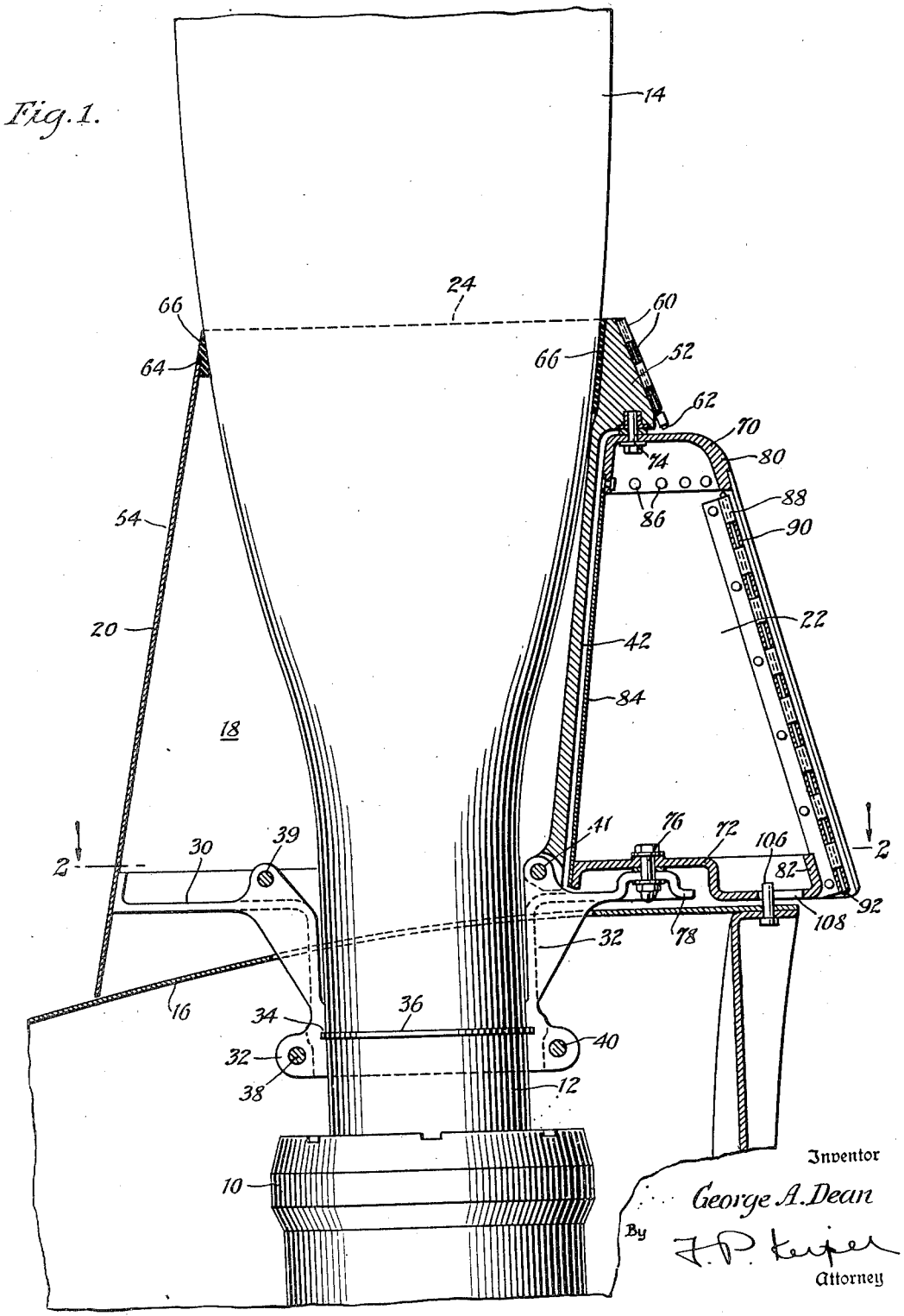
Fig. 1 is a view in side elevation of a propeller socket and blade having thereon a cuff articulated at one end, the cuff being illustrated in section.
Figure 2:
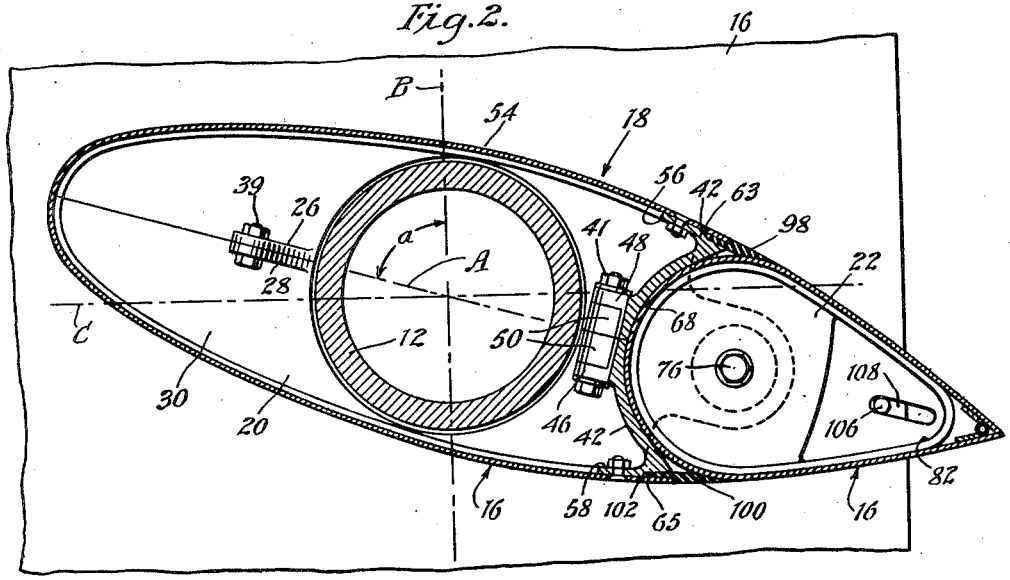
Fig. 2 is a transverse section taken substantially on the line 2—2 of Fig. 1.
Figure 3:
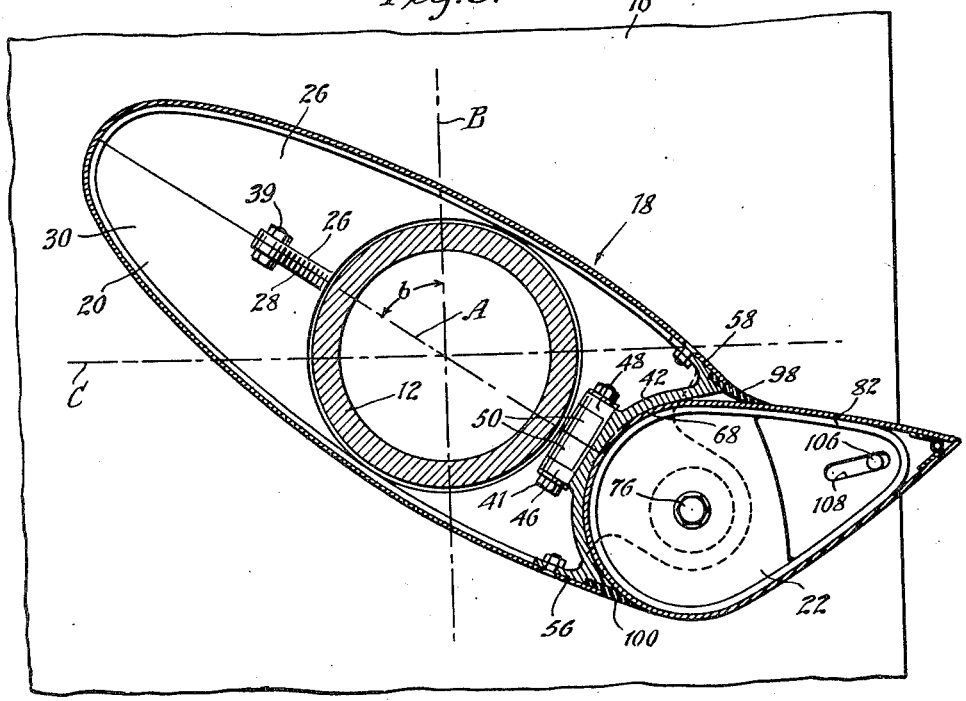
Fig. 3 is a transverse section similar to Fig. 2 illustrating the mode of operation of the cuff and relative movement of the parts.

Referring to Figs. 1 to 3, there is illustrated a hub socket 10 in which is swively mounted the shank 12 of a propeller blade 14. The hub socket 10 and shank 12 are enclosed within a spinner 16 carried by the hub and mounted for rotation therewith. Secured to the shank 12 and surrounding the lower portion of the blade 14 is a blade cuff 18 composed of a central and forward section 20 rigidly secured to the blade shank and a rear articulated trailing edge section 22 pivotally mounted with respect to the central and forward cuff portion 20. The central and forward position and the trailing portion are shown in transverse section, the section plane being substantially that of the longitudinal median plane of the blade surfaces at the line of intersection of the cuff with the blade as indicated at 24. It will therefore be understood that the section plane is angularly disposed with respect to the hub axis of rotation.

The central and forward cuff section 20 is provided with a support constituted by split members 26 and 28 forming together an air foil shaped bulkhead 30 and a blade shank gripping sleeve 32, the latter having an annular internal groove 34 engaging an integral cuff ring 36 on the blade shank. The split members and sleeve are clamped tightly about the shank by the tie bolts 38 and 40.

Supported from the bulkhead 30, immediately to the rear of the blade shank, is an upwardly extending arcuate sectioned conical member 42 which is secured to the bulkhead by the bolt 41 passing through spaced ears 46 and 48 integrally formed upon the member 42 embracing the ears 50 integrally formed upon the divided bulkhead parts. The extension member 42 projects upwardly to the upper marginal limit of the cuff 18 as indicated by the line 24 and the upper portion 52 thereof is suitably shaped to receive the upper trailing edge portion of the sheathing 54. The sheathing 54 is formed of light weight sheet metal and is shaped to conform to the blade cross section at the upper margin 24, and to embrace the airfoil shape of the bulk head 30. The sheathing is secured in place, around the suitably shaped portion 52 by means of interengaging loops 60 and a lock pin 62, corresponding in part to piano hinge construction. The sheathing is also secured along its rear edges 63 and 65 to flanges 56 and 58 integral with the upwardly extending member 42. The upper edge 64 of the sheathing 54 and the upper portion of the member 42 embrace the propeller blade 14 through a thin suitably shaped resilient gasket 66 of rubber-like material to form a water tight seal between the blade and the cuff.

The member 42 is shaped to provide an arcuate conical recess 68 in which the trailing edge portion 22 of the cuff is rotatably mounted, upon an axis co-incident with the axis of the surface of the conical recess 68. The trailing edge portion comprises an assembly formed of upper and lower end members 70 and 72 pivoted on pins 74 and 76 lying upon the aforesaid axis of the conical recess, the upper pin 74 being fixed in the under side of the contoured portion 52 and the pin 76 being carried by a rear projection 78 of the bulkhead 30. The end members 70 and 72 are provided with flanges 80 and 82, respectively, which are substantially circular about the axis of the pivots 74 and 76 over the forward part of the end members, the circular flanges yielding to a V configuration cooperating with the forward section of the blade cuff to complete the trailing edge of an air foil section. About the flanges 80 and 82 is formed a sleeve 84 secured to the flange 80 in a shouldered recess by rivets 86. The sleeve extends around both end members to the rear thereof, where the marginal edges of the sleeve are joined together to form a sharp V trailing edge by interlocking piano hinge-like members 88 and 90 riveted to the sleeve adjacent its marginal edges, the members being held together by a pin 92.

The forward and central section of the cuff with the conical recess of the member 42 cooperates with the trailing edge section 22 to form a streamlined blade cuff as is generally indicated in Fig. 2. The gap between the rearward edges 63 and 65 of the cuff sheathing 54 and the circular curvature of the trailing edge member 22 and its surrounding sleeve 84 is filled with flexible resilient flap members 98 and 100 suitably secured or clamped between the edges 63 and 65 of the sheathing 54 and the flanges 56 and 58 of the member 42, the flanges being offset as at 102, to facilitate the reception of the flaps.

The cuff as illustrated in Fig. 2 is shown as having a pitch angle $a$ formed between the median plane of the cuff A, and the rotation plane B, illustrated as perpendicular to the hub axis C. It will be understood that the high pitch shown, as indicated by the angle $a$ is usual for propeller cuffs when operating efficiently at cruising speeds. It will at the same time be appreciated that if the pitch of the blade is reduced by a fixed number of degrees such that the outer thrust portion of the blade may act efficiently for take off purposes that the blade and its cuff would actually be rotated within its socket through the same angle as the outer blade portion, to the pitch angle indicated at $b$ in Fig. 3. It will appear that the cuff angle $b$ presents a high and inefficient angle of attack at take off. The cuff at this pitch angle is ineffective to produce an efficient fan for engine cooling purposes.

In order to improve the effectiveness of the cuff for engine cooling at low airspeed in some types of aircraft power plant installations when the blade pitch is reduced as in Fig. 3 for take off, the air foil contour of the cuff is altered in order to give it a scoop-like effect as in Fig. 3. To automatically effect a change in contour in response to a change of pitch of the blade within its socket, the rear section 22 of the cuff is caused to rotate with respect to the forward and central portion of the cuff by a mechanism co-acting with the spinner 16 or any other suitable member rotating with the hub about the hub axis. In the form shown the spinner 16 is provided with an upwardly extending pin 106 located to the rear of the blade shank and to one side of the plane common to the hub and blade axes. The pin projects into a slot 108 in the end member 72 of the trailing edge section 22 of the cuff so that upon rotation of the blade 14 within its socket 10, the trailing edge portion is caused to rotate relative to the blade as determined by the relative position of the axis of the pivots 76 and 74 and the axis of the pin 106. Thus as is shown in Fig. 3, the blade is caused to take on the form of a scoop, which in the installation for which it is adapted will be more effective in blowing cooling air into the engine.

In order to enhance the effect produced by the structure shown in Figs. 1 to 3, the blade cuff 18 may be provided, as in Figs. 4 to 7, with a forward section 110, also articulated with respect to the central portion of the cuff, the central portion of the cuff being fixed as heretofore described to the shank of the propeller blade. In such an arrangement the central member 111 of the cuff is cut away forwardly, and provided with an upwardly extending member 112 secured at its lower end to the bulkhead 113 and to the cuff sheathing 154 by means of flanges 114 and 116. The wall 118 of the member 112 is formed in outline as an arcuate section of a cone, the axis of which lies coincident with pivots 120 and 122 about which the forward or leading edge section 110 is adapted to rotate. The forward section 110 is ovoid in outline to supplement and cooperate with the remainder of the cuff to effect a streamlined air foil section and the rear surface 124 is conical, to cooperate with the wall 118 and closure flaps 126 and 128 secured to the flanges 114 and 116 and central section cuff sheathing 154. The curved surface 124 thereby coacts with the flaps 126 so that when the forward section is rotated about the pivots 120 and 122 a smooth air stream engaging surface is provided.

In order to cause the forward section 110 to rotate relative to the central section of the cuff in response to changes of blade pitch, a suitable linkage comprising a lever 129 is provided, co-acting between a pivot 130 carried by the spinner 116, an extension of the pin 122 and a pivot 132 carried by the end member 134 of the forward section. The lever 129 is suitably slotted as at 136 and 138 to permit the necessary displacement of the pins 131 and 132 with respect to the lever 129 during the relative movement set forth.

As shown in Fig. 5 it will be seen that when the blade shank 12 is rotated through an angle such that the central cuff section 18 is moved to the position indicated by the outline D, the trailing edge section 22 will assume a relative position as indicated by the outline E and the forward section 110 will assume with respect to the central portion of the cuff the position as indicated by the outline F. The over all effect of the relation of the parts as indicated by the outlines D, E, and F is such as to produce a blade of pronounced curved or scoop-like air foil section at once capable of more efficiently directing air rearwardly into the engine cowling for engine cooling purposes. Since the pitch of the blade will be increased from the position shown at D to the normal angle employed during flight as shown in the full lines in Fig. 5, as soon as the air speed velocity warrants, the shape of the cuff will be returned to a streamlined symmetrical shape, efficient for directing air into the engine cowling when the air speed is high as in cruising.

Figure 6:
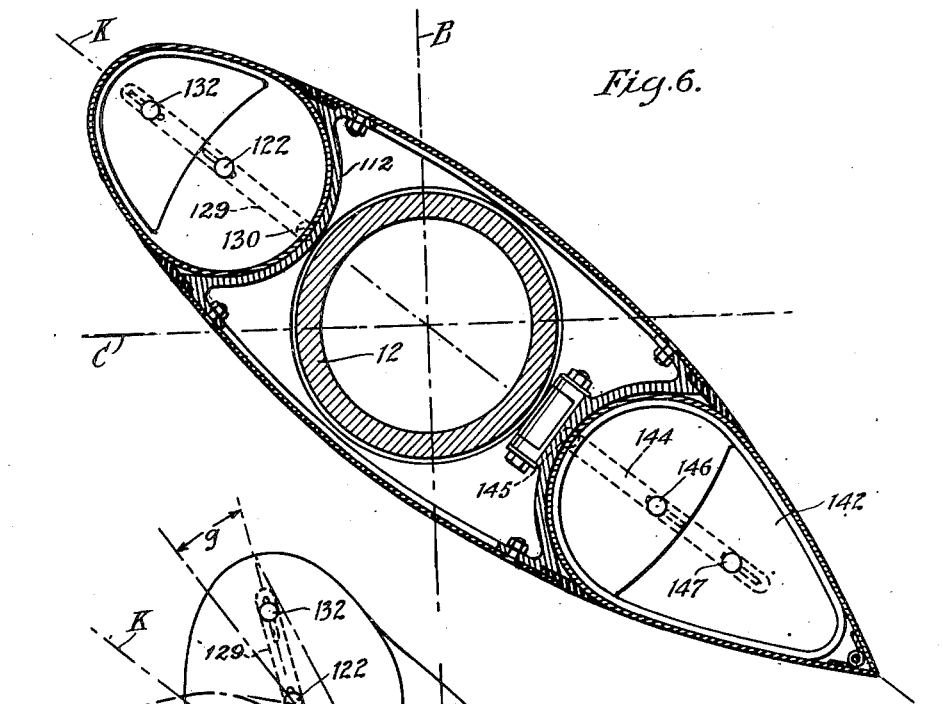
Fig. 6 is a transverse section taken through a cuff articulated at both ends in which the movement of the opposed ends is modified to provide effective pitch increases.
Figure 7:
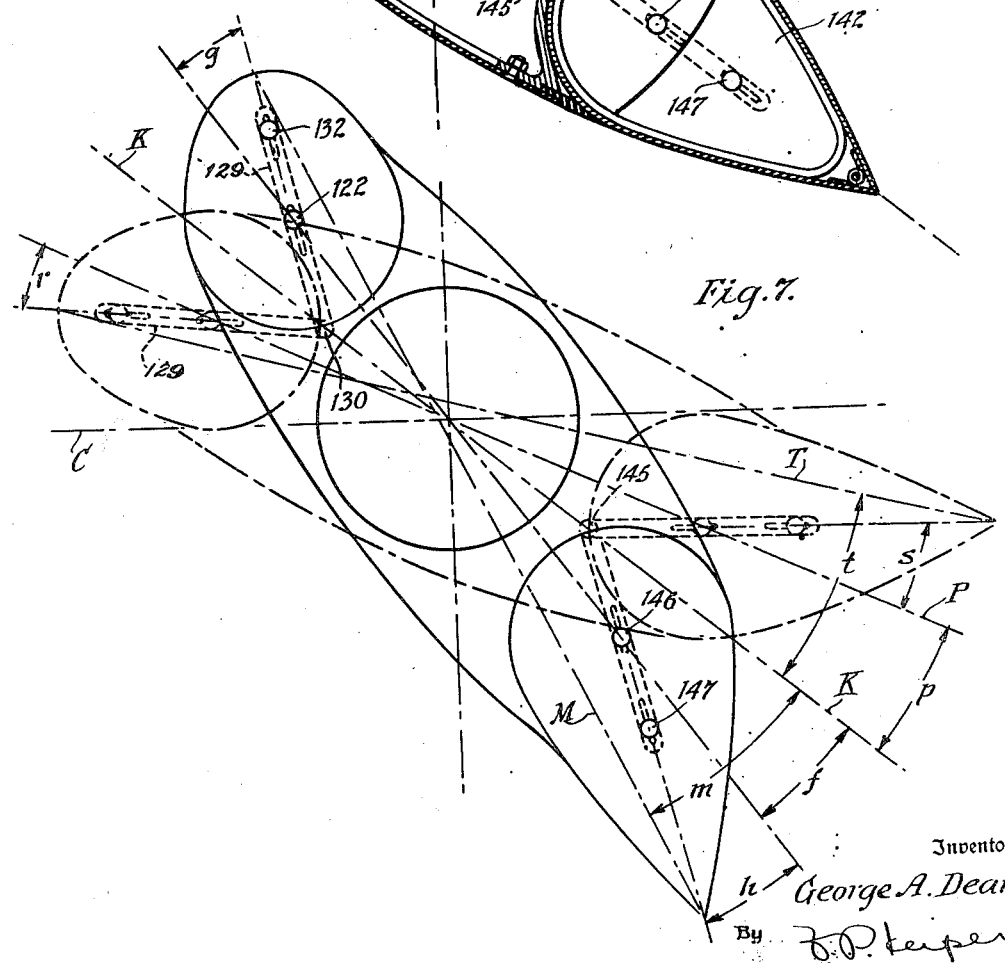
Fig. 7 is a diagrammatical outline of the modified form illustrated in Fig. 6 showing the relative movement of the parts.

It will be observed that the linkage employed in Figs. 4 and 5 in connection with the leading edge section serves to cause the leading section to rotate through an angle such as to in effect create a cuff contour, the combined effective axis of which has moved through an angle greater than the rotation of the blade itself or the center section. In effect the forward portion of the cuff has, through the change in outlines, been reduced in pitch to a greater extent than the angle through which the blade has actually been rotated. By applying the principle disclosed with reference to the forward section of the cuff to the rear or trailing section of the cuff, as shown in Figs. 6 and 7, it becomes possible to provide a cuff which, although fixed to rotate with the blade upon changes in pitch, actually produces an effective change in pitch greater than the angle through which the blade is rotated. As shown in Fig. 6 the trailing section 142 is actuated by means of a linkage similar to that shown in conjunction with the forward section 110 shown in Figs. 4 and 5.

The linkage consists of a lever 144 pivoted to the spinner at 145, to the bulkhead at 146 and the trailing edge section at 147. When the central section of the cuff is rotated by the blade from the pitch angle shown in Figs. 6 and 7 as represented by the line K, to the position shown in full lines in Fig. 7, the blade, and central section of the cuff have rotated through the angle $f$. The nose portion of the cuff has been caused to rotate through the additional angle $g$ and the trailing edge section has been caused to rotate through the angle $h$. The effective solid line outline resulting from the rotation of the forward section through the angle $g$ and the rear section through the angle $h$ results in an effective air foil section, the approximate center of which lies along the line M so that the effective pitch of the cuff has been rotated through an angle greater than the angle K or as indicated by the angle $m$. The resulting effect is that the pitch angle of the cuff is reduced sufficiently so that it can act more efficiently to produce thrust or supply cooling air to the engine or engine cowling in the kind of power plant installation for which this arrangement is best adapted. When the pitch of the blade is increased, as during normal or high speed flight conditions, the blade is rotated from the position shown in Fig. 6 and the pitch angle K (Figs. 6 and 7) through the angle $p$ so that the pitch of the central position of the cuff is indicated by the line P. Because of the high speed of the plane and the angle of the relative wind at the cuff, it is desirable to increase the effective pitch of the cuff at this time beyond the increase in blade pitch. Accordingly as is shown in Fig. 7, in dot and dash outline, the nose portion of the cuff is caused to move with reference to the central portion of the cuff through the angle $r$ and the trailing edge portion is caused to rotate through the angle indicated at $s$, thereby creating an effective air foil center line approximately as indicated at T, the pitch of which has been increased by the angle $t$, an angle greater than the angle $p$ through which the cuff and blade were rotated. Thus the effective cuff pitch angle moves through a wider angular range than the blade itself during changes of pitch, to thereby improve the efficiency of the cuff at the blade pitch angle extremes, both of which are important, since one involves efficient cruising and the other efficient take off, and cooling pursuant thereto.

While several modified forms of the invention have been illustrated and described with simplicity, it is to be understood by those skilled in the art that the invention is not limited thereto, but may be embodied in various forms equally effective to obtain the objects of the invention. For example, the location of the pivots may be altered, or the form of the linkage changed. The articulated cuff may be resiliently held in one position, and caused to vary its effective contour in response to centrifugal force, acting on suitably positioned weights, or the inherent center of gravity of the articulated sections, or a positive pitch controlling motor remotely controlled may be employed to change the effective contour. As many changes may be made without departing from the spirit of the invention, reference will therefore be had to the appended claims for a definition of the limits of the invention.

What is claimed is:

1. In combination with a variable pitch aircraft propeller, a hub, a blade swivelled upon said hub, an articulated extension comprising a prolongation of the airfoil part of said blade having at least two sections coextensive in span and one trailing the other in a chordwise direction, said sections being relatively rotatable with respect to one another, to alter the extension airfoil form, and means responsive to rotation of said blade with respect to the hub for rotating said sections relative to one another to alter the extension airfoil form.

2. In combination with a variable pitch aircraft propeller, a hub socket, a blade having a shank swivelled in said socket, an articulated extension comprising a prolongation of the airfoil part of said blade and embracing said shank having a central section fixed with the blade and shank and leading and trailing edge sections rotatable with respect to the central section to effect changes in extension air foil form, and means responsive to rotation of said blade in its socket for rotating said leading and trailing edge sections relative to the central section.

3. In combination with a variable pitch aircraft propeller, a hub socket, a blade having a shank swivelled in said socket, an articulated blade cuff having a central section fixed to said blade and leading and trailing edge sections rotatable with respect to the central section to effect changes in cuff air foil form, and means responsive to rotation of said blade in its socket for rotating said leading and trailing edge sections relative to the central section.

4. In combination with a variable pitch aircraft propeller, a hub socket, a blade having a shank swivelled in said socket, an articulated blade cuff having a central section fixed to said blade and leading and trailing edge sections rotatable with respect to the central section to effect changes in cuff air foil form, and means responsive to rotation of said blade in its socket for rotating said leading and trailing edge sections relative to the central section, said means rotating one of said sections in the same direction of rotation as said blade with respect to its socket.

5. In combination with a variable pitch aircraft propeller, a hub socket, a blade having a shank swivelled in said socket, an articulated blade cuff having a central section fixed to said blade and leading and trailing edge sections rotatable with respect to the central section to effect changes in cuff air foil form, and means responsive to rotation of said blade in its socket for rotating said leading and trailing edge sections relative to the central section, said means rotating both of said sections in the same direction of rotation as said blade with respect to its socket.

6. In combination with a variable pitch aircraft propeller, a hub socket, a blade having a shank swivelled in said socket, an articulated blade cuff having a central section fixed to said blade and leading and trailing edge sections rotatable with respect to the central section to effect changes in cuff air foil form, and means responsive to rotation of said blade in its socket for rotating said leading and trailing edge sections relative to the central section, said means rotating one of said sections in the same direction of rotation as said blade with respect to its socket, said means rotating said sections in opposite directions with respect to said center section.

7. In combination with a variable pitch aircraft propeller, a hub socket, a blade having a shank swivelled in said socket, and an articulated blade extension comprising a prolongation of the air foil part of the blade having at least two sections coextensive in span and one trailing the other in a chordwise direction, said sections being relatively rotatable with respect to one another to alter the effective pitch of said extension relative to said blade.

8. In combination with a variable pitch aircraft propeller, a hub socket, a blade having a shank swivelled in said socket, an articulated blade extension comprising a prolongation of the air foil part of the blade having at least two sections one trailing the other relatively rotatable with respect to one another, a spinner associated with said blade and hub, and linkage reacting upon said spinner and connected to said extension for moving one of said sections relative to the other, upon rotation of said blade in its socket.

GEORGE A. DEAN.

REFERENCES CITED

The following references are of record in the file of this patent:

UNITED STATES PATENTS

| Number | Name | Date |
| --- | --- | --- |
| 2,125,187 | Lansing | July 26, 1938 |
| 2,145,805 | Ring | Jan. 31, 1939 |
| 2,210,190 | Stanley | Aug. 6, 1940 |
| 2,308,802 | Barling | Jan. 19, 1943 |
| 2,309,466 | Martin | Jan. 26, 1943 |

FOREIGN PATENTS

| Number | Country | Date |
| --- | --- | --- |
| 851,766 | France | Jan. 15, 1940 |